Dec. 5, 1944.  H. W. THOMAS  2,364,404

SCREEN MATERIAL

Filed March 16, 1940  3 Sheets-Sheet 1

INVENTOR.
Harry W. Thomas

BY Samuel Ostrolenk
ATTORNEY.

Dec. 5, 1944.  H. W. THOMAS  2,364,404
SCREEN MATERIAL
Filed March 16, 1940   3 Sheets-Sheet 2

INVENTOR.
Harry W. Thomas
BY Samuel Ostrolenk
ATTORNEY.

Dec. 5, 1944.   H. W. THOMAS   2,364,404
SCREEN MATERIAL
Filed March 16, 1940   3 Sheets-Sheet 3

INVENTOR.
Harry W. Thomas
BY Samuel Ostrolenk
ATTORNEY.

Patented Dec. 5, 1944

2,364,404

UNITED STATES PATENT OFFICE 2,364,404

SCREEN MATERIAL

Harry W. Thomas, Miami Beach, Fla.

Application March 16, 1940, Serial No. 324,393

9 Claims. (Cl. 139—420)

This invention is a continuation-in-part of my application Serial No. 265,114, filed March 31, 1939, and relates to woven mesh, preferably reticular material composed primarily of mono-fil rods of thermoplastic or thermosetting, synthetic resins and to a method of making such material, and is more particularly related to an open mesh, flexible, elastic, resilient and structurally strong screen cloth composed primarily of such mono-fil rod material with permanent crimps, corrugations or irregularities arranged in each of the mono-fil rods in order to provide a self-adjusting, positioning element whereby the regularity of the mesh may be maintained under all conditions of use.

In accordance with my present invention, woven, meshed or screen material, preferably reticular in form, may be made from non-metallic organic and inorganic fibers or mono-fil rods which have no conductive properties, are moisture resistant, are not affected by common acids and alkalis and are non-oxidizable, weather resistant, and which may be either transparent, translucent, opaque or colored.

The mono-fil rods may be composed wholly of synthetic, polymerization products such as vinyl resins, and they may be formed from resins such as aldehyde condensation products and even the alkyd resins and even cellulose derivatives including cellulose nitrate, cellulose acetate and cellulose ethers such as ethyl or benzyl cellulose.

One of the commercialy prepared materials readily adaptable for use in connection with the present invention is the synthetic resin now available known as nylon, and the invention will hereinafter be specifically described as embodying the use of nylon, although it must be understood that nylon is set forth in this specification as an example of the various other materials herein defined which may be used for the purpose.

Nylon itself is the generic name for the entire class of artificial fiber forming materials known as linear condensation polyamides. These polyamides may be derived from polymerizable monoaminomonocarboxylic acid and their amide forming derivatives as well as from the reaction of suitable diamines with suitable dicarboxylic acids or amide forming derivatives of dibasic dicarboxylic acids.

While nylon therefore is a designation for a generic class of materials and while this material will hereinafter be referred to generically in this description, it must be understood that any thermoplastic or thermosetting synthetic, non-metallic, organic or inorganic material may be utilized in the same manner for the same purposes.

For purposes of the present invention, I prefer to use the nylon in the form of a single solid rod rather than as a multi-filament fiber, since I rely for the operation of my invention upon the inherent elasticity and self-supporting, self-setting characteristics of the nylon material.

While organic material, such as nylon, is preferred, flexible films and filaments from suitable gels of inorganic materials, including alsifilm and clays, of which bentonite is an example, may be utilized.

The synthetic, non-metallic, organic materials of which nylon is an example may readily be made in the form of solid, continuous rods or as multi-filament strands. Where the strand is made of a plurality of fine filaments, then there is a distinct possibility that each of the strands may possess too much flexibility and that the elasticity may be too unevenly distributed throughout the strand for the strand to be embodied in the type of mesh having the mechanical and physical features required in my screen cloth.

In accordance with my present invention, the nylon rods are woven in any suitable manner to produce an open mesh screen cloth. This screen cloth has a warp and weft denier and count usual in wire screen cloths generally manufactured for insect and dust excluding purposes. The mesh material thus created is then subjected to a heat treatment for setting the strands in the proper position.

The heat treatment forms permanent crimps in the strands without fusing the crossed mono-fil rods together so that each of the rods of the resulting screen cloth has a permanent hill and dale formation with the warp rod and the weft rods contacting each other at their dale portions or at the troughs of the corrugations. That is, the warp and weft rods are complementarily crimped so as to resiliently maintain each of the rods in the predetermined permanent position.

In order to avoid any possibility of the rods returning or tending to return to their original uncrimped position, the woven screen may immediately after the heating process which results in the crimping above mentioned be cooled to help fix the strands in their crimped position.

The corrugated, crimped or hill and dale formation of each of the rods is fixed. The synthetic, non-metallic, organic material such as nylon utilized for the formation of my screen is of such elasticity that even though the mono-fil rods are tensioned in a manner tending to straighten out the crimps, upon release of the tension, the rods will immediately resume their corrugated shape.

In this manner, the openings of the meshes are of permanent size and even though the rods may be deformed by pressure against the screen or even by the insertion or forcing of large objects into or through the mesh openings, nevertheless upon the removal of such tensioning or deforming force, the rods will immediately resume their crimped condition and complementary crimps in each of the rods in their tendency to slide into registry with each other will restore the rods to their original position.

An important object of this invention, therefore, is the formation of a physically strong elastic resilient and yet flexible open mesh screen cloth formed of synthetic, non-metallic, organic material which is thermoplastic or thermosetting.

Still another object of the present invention is the formation of a screen cloth of the type above described from a series of rods made of non-metallic, organic or inorganic, synthetic material, each of the rods being complementarily crimped at their intersection with intersecting rods in order to provide for a resilient predetermined positioning element for each of the rods.

Still another object of the present invention is in a screen made from a thermosensitive or thermoplastic, synthetic, organic or inorganic, non-metallic material to provide a series of crimps in each of the rods, each of the crimps being made at such an angle that the crimp, when under tension owing to tension upon the rod, may be straightened out without going beyond the elastic limit of the rod so that upon relaxation of tension upon the rod, the crimp will return to its original form.

The screen cloth of the present invention may be utilized wherever a screen of any type is of use. It may thus be used for window screens, door screens, insect and dust excluding screens of any kind. It may be used for roll-up screens, it may be used as back screens or webs in the manufacture of upholstery, it may be used by using rods of material of sufficient thickness as flat springs of various types, it may be used as chair seats, it may be woven into hammocks and furniture, it may be used for tennis rackets and nets, it may be used in connection with metallic insert members as capacity screens, insect exterminating screens, and for any other and every other purpose in which a screen of any kind may have any utility.

One of the important elements to be noted is that by the use of a rod of the material rather than by using multifilament strands, the intention here is to produce not a flexible cloth suitable for wearing apparel but a screen cloth having the physical and mechanical characteristics above described and necessary to the proper functioning of a screen.

An important object of the present invention is to provide a reticular material composed of thermoplastic or thermosensitive, synthetic, non-metallic, organic or inorganic mono-fils wherein the mono-fils are of rod-like formation and do not consist of a multiplicity of fine filaments.

Another object of the present invention is to provide an open mesh screen cloth composed of permanently set crimped thermoplastic or thermosensitive rods.

Still another object of the present invention is to provide an open mesh screen cloth composed of nylon warp and weft rods.

Still another object of this invention is to provide a process for permanently setting a flexible elastic screen cloth by a heating operation.

Other and further important objects of the present invention will in part be apparent and in part pointed out in the following description and drawings, in which.

Figure 1:
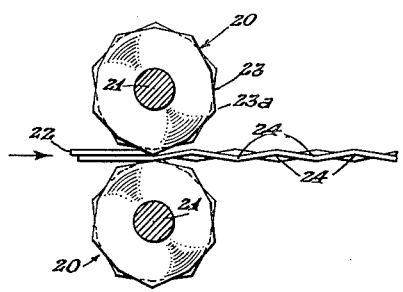
Figure 1 is a side view partly in cross-section of crimping rolls for pre-crimping rods of nylon for use in the present invention.
Figure 2:
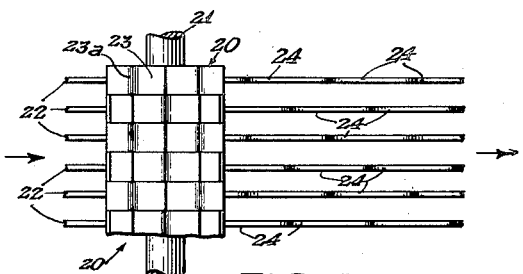
Figure 2 is a top view of the crimping roll of Figure 1 showing the crimping of the rods of nylon.
Figure 3:
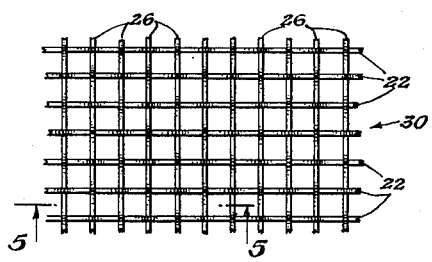
Figure 3 is a plan view of a screen cloth woven from the nylon rods of Figures 1 and 2.

Referring now to Figures 1 and 2, I have here shown an apparatus wherein the nylon monofil rods are pre-crimped before being woven into the screen of Figure 3.

A pair of cooperating crimping rolls 20 are rotatably mounted upon their shafts 21 and driven from any suitable power source. The nylon rods 22 are unreeled from a series of spools suitably mounted in spaced relation to each other or are drawn from any other source in any suitable manner and passed between the crimping rolls 20—20.

The crimping rolls comprise angular projections 23a and angular recesses 23 which complement each other, that is, any angle recess 23 of either roll will cooperate with an angular projection 22a of the opposite roll.

The passing of the nylon rods in spaced relation through the pre-crimping rolls produces a series of crimps 24—24 in each of the rods. The crimps alternate in direction, that is crests and troughs or hills and dales follow each other in each of the nylon rods 22.

An individual crimping wheel may be provided for each rod. Or the crimping roll may consist of a series of individual wheels bound together upon a single shaft.

Figure 12:
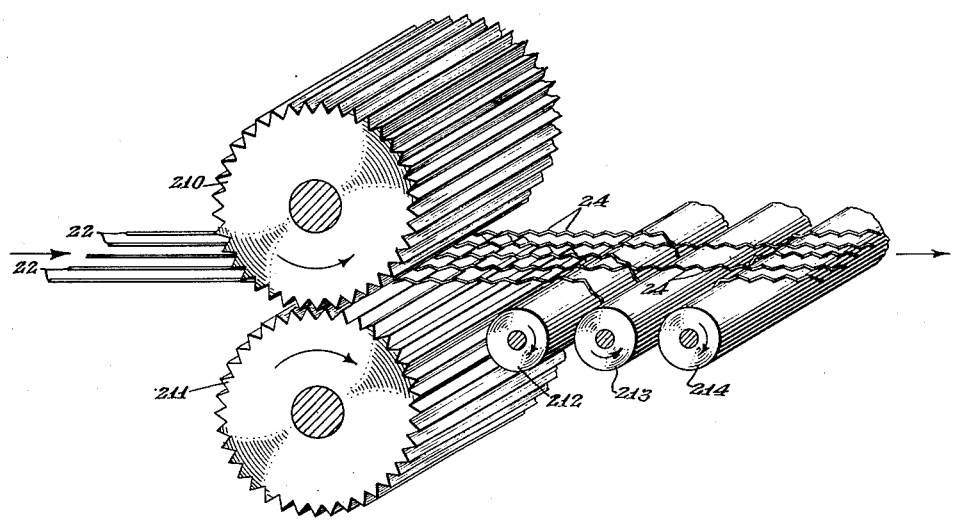
Figure 12 is a view in perspective showing modified crimping rolls and apparatus.
Figure 13:
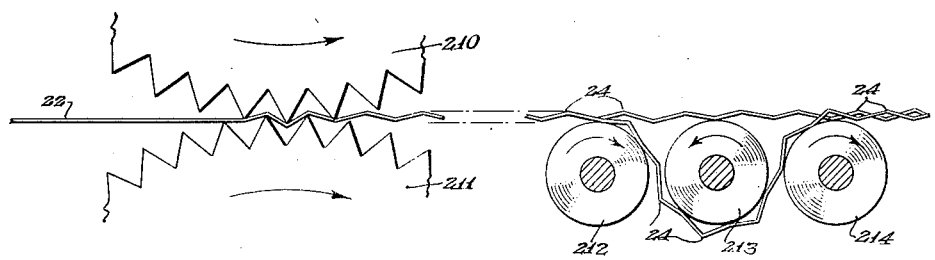
Figure 13 is a side elevation of the crimping rolls and apparatus of Figure 15.

It is important for the subsequent weaving operation that the hill and dale locations in adjacent rods be staggered with relation to each other and, accordingly, as seen in Figures 1 and 2, each of the crimping rolls for each individual rod is so arranged as to produce this staggered effect.

Where it is desired to use corrugating rolls where no special provision is required in the corrugating or crimping roll itself for the production of alternating crimps in adjacent rods, then an adjustment such as that shown in Figures 12 and 13 is required.

In Figures 12 and 13, the individual rods 22 are led between crimping or corrugating rolls 210 and 211 which, as will be seen, are single continuous uniform meshing rolls. The rods 22 after they emerge from these rolls are crimped at 24 in the manner above described.

During the crimping operation heat may be applied either from within the rolls or to the rolls or the rods in order to obtain the crimp or set desired.

However, by the use of rolls of the type 210 and 211, the crimps in adjacent rods are in corresponding relation with respect to each other.

It is important as above pointed out, however, that the crimps in adjacent rods be staggered with relation to each other.

One method which I have found feasible in producing this result is to give alternate rods an added travel so that by the lengthening of the path of travel in a predetermined manner, the crimps in adjacent rods may become staggered with relation to each other.

Accordingly, as seen in Figures 12 and 13, alternate rods 22 having the crimps 24 are passed under the roller 213. Since these alternate rods are guided by the rolls 212 and 214, they are returned to their original plane after having been passed out of the original plane of the web. The path described by the alternate rods in travelling beneath the roll 213 is of such length that after these alternate rods emerge from beneath the roll 213 and pass over the roll 214, the crimps in these rods are staggered with relation to the crimps in the remaining rods which have not been passed beneath the roll 213. In this manner, the staggered relation of the crimps in alternate rods may be obtained and further operations in accordance with the description hereinabove and hereinafter set forth may then be performed.

In a suitable case, pressure alone of a high order may be sufficient to obtain the crimping desired, although heat may be applied in any suitable manner to or within the crimping rolls in order to ensure that the crimps within the nylon rods will assume a permanent form.

The nylon rods may, if desired, be rolled up on spools immediately after the crimping operation takes place and thereafter the pre-crimped material may be utilized for the weaving of the screen of Figure 3. Or the nylon mono-fil rods 22 may, as is seen in Figure 2, be passed in spaced relation to each other through the crimping roll and thence directly onto the loom or other weaving device where the rods of Figure 2 may form the warp of the woven screen.

The weft rods 26 of Figure 3 may be woven through the warp rods in any suitable manner as, for instance, by means of a shuttle. Owing to the elasticity of the nylon material, the pre-crimped nylon mono-fil rods may be wound up on a bobbin without destroying the crimp. The weft rods 26 can, if desired, be tensioned during the weaving operation to straighten out the corrugations therein but immediately upon release of the tension, the troughs or dales of the crimps will register with complementary troughs or dales in the crimps of the warp rods.

Figure 5:
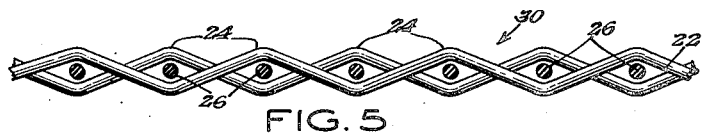
Figure 5 is a cross-sectional view taken on line 5—5 of Figure 3 showing the condition of the rods of the screen cloth of Figure 3 before the thermal fixing operation.

After the screen of Figure 3 is woven with the pre-crimped nylon rods shown in Figure 2, the rods thereof may be in loose relation to each other as shown in Figure 5. That is, the crimps 24 are in such relation that should the meshes of the screen be displaced, the elasticity of the screen itself and the resilience of the crimp would tend to drive the mesh back into its original position. But owing to the looseness necessarily inherent in the original weave, this tendency, while it does exist, will nevertheless not be as effective as if the weave were tight and as if the mono-fil rods were in close frictional relation with respect to each other.

Figure 4:
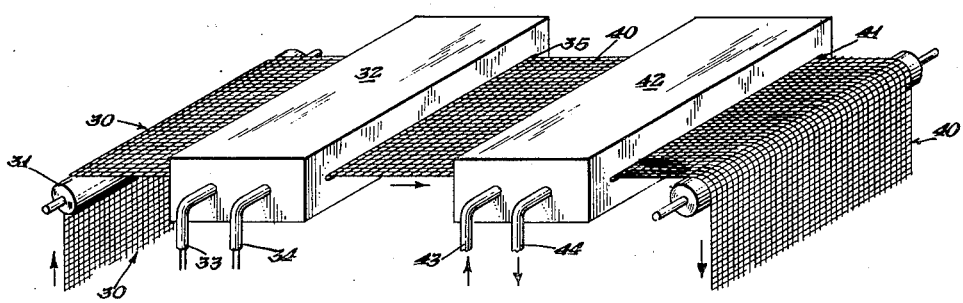
Figure 4 is a view in perspective showing the screen cloth of Figure 3 being drawn through the heating and cooling apparatus for thermally fixing the mono-fil rods of the screen of Figure 3 in their desired position.

In order to tighten the mono-fils and in order to cause each of the crimps in the mono-fils to adopt a permanent set with relation to the complementary crimps of intersecting strands with which they happen, in the woven screen cloth, to be related, I then pass the woven screen cloth of Figure 3 through the heating and cooling apparatus shown in Figure 4. That is, the originally woven screen cloth 30 is passed in any suitable manner over any suitable guide rollers, such as guide roll 31, through a heating chamber 32.

In order that the tight frictional set should be obtained in this manner, the woven screen cloth made from the pre-crimped mono-fils should be subjected to heat in the manner herein described while the cloth is in a taut tension position. In order to produce this close frictional set, it is necessary that the material be drawn by the application of tension toward this close setting position. When the precrimped material is thus passed through the heating chamber while taut, the crimps may be adjusted or even reformed to produce the close frictional set above described provided the subsequent cooling operation is immediately applied while the material is still in tension.

The heating chamber may be operated in any suitable manner and by any suitable heating means, the time and temperature of which can be controlled. Various heating means can be applied, including steam, hot air or gases, or any standard electric heating coil may be used.

Thus where steam or hot air or hot gases of various kinds are to be used for the heat treatment, the heat chamber 32 comprises an inflowing duct 33 through which the hot steam, hot air or other heated gases may be forced, the said duct communicating with either heating coils within the heating chamber 32 or with tubes or other means having direct openings directed upon the screen fabric to subject the fabric to the direct influence of the heated fluid.

A suitable exhaust duct 34 may be provided at any appropriate portion of the heat chamber 32.

Figure 6:
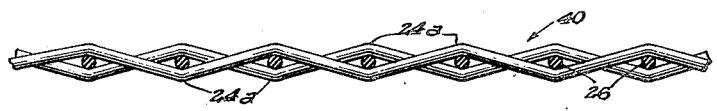
Figure 6 is a view corresponding to that of Figure 5 showing the condition of the rod after the fixing operation.

After the screen fabric emerges from the passage 35 of the heating chamber 32, it is in the form of the final screening material 40 of Figure 6. It, when cooled, acquires the permanent set which creates a tight frictional fit between the mono-fils in the manner shown in Figure 6.

The mono-fil rods of nylon material have, by the heat treatment process, virtually been caused to flow about each other without fusing with each other and have adopted a permanent crimp or set specifically with relation to each other which now resiliently resists any displacement of one rod with respect to an intersecting rod, and by reason of this resilient condition increases the tendency of any displaced rod to slide down the trough or dale of the crimp of the intersecting rod to resume its original position.

Furthermore, in the event that in the woven fabric 30 of Figures 3 and 4 and 5, there should be any possibility of a lack of registry between complementary crimps, the heat treatment by the process herein described will reform the crimp to ensure such registry.

The screen may then immediately be exposed to a cooling process such as cold air applied immediately after the screen leaves the oven for the purpose of rapidly completing the setting of the crimps in the material and making a permanent set. For this purpose, the now formed screen 40 (Figure 4) may be passed through a slot 41 in a cooling chamber 42 having an intake duct 43 and an outlet 44 for the purpose of admitting cooling gases or other cooling means of any type.

The finished screen 40 is then ready to be utilized as a screen for any of the purposes or uses hereinabove set forth. For the purpose of forming the screening material of the present invention, it is not essential that the rods of nylon from which the screening material is formed be pre-crimped.

Figure 7:
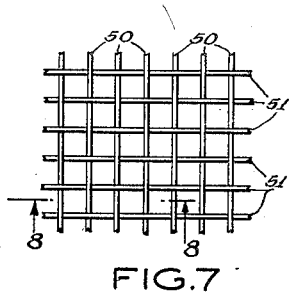
Figure 7 is a plan view of a screen cloth woven from two set of uncrimped rods of nylon.

As seen in Figure 7, the nylon may be interwoven in the ordinary manner, the weft 51 intersecting with the warp 50 with no attention being paid during the actual weaving process to any crimping which may be needed to obtain the resilient, self-restoring effect hereinabove described.

Figure 8:
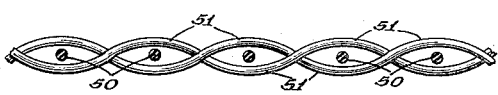
Figure 8 is a cross-sectional view taken on line 8—8 of Figure 7 showing the relationship of the woven rods to each other before heat treatment.

In this way, the woven result will have a cross-sectional appearance such as that shown in Figure 8 where the rods of nylon merely are interwoven or intermeshed with each other.

In order to obtain the crimped result which is so important to the utility and operation of the present invention, it is necessary merely to pass the woven screen material of Figure 7 and Figure 8 through the heating chamber 32 and the cooling chamber 42 of Figure 4 utilizing for this purpose the same process as that described in connection with Figure 4.

Since the nylon material is thermosensitive or thermoplastic, the material is caused by the heat to permanently set in the crimped form which it has obtained as shown in Figure 8 by the weaving process itself.

Figure 9:
Figure 9 is a view corresponding to that of Figure 8 showing the condition of the rods after the heat treatment.

But not merely does the heat treatment set the nylon in the crimped form shown in Figure 8, but it also causes the nylon material to flow and set without fusing with adjacent strands of nylon about the adjacent strands to produce the final tightly crimped result shown in Figure 9 wherein crimps 24a of hill and dale formation cooperate with complementary crimps on intersecting rods.

While in the description herein, emphasis has been placed upon nylon, it must be understood that with appropriate changes in temperature and time of operation, any thermo-sensitive or thermo-setting, non-metallic, organic, synthetic material may be treated in the same manner to produce exactly the same result.

One of the important characteristics which such material should have is elasticity, the ability to return to the pre-crimped position after it has been tensioned to such an extent as to straighten the crimp out.

At present I prefer nylon as the material best suited for this purpose. It has a melting point of approximately 507° F. but is thermoplastic or thermosensitive at a temperature well below this melting point.

Thus in the heating process above described, it may be subjected to a temperature of from anywhere from 120° F. up to its melting point in order to obtain the crimping desired. In suitable instances, the nylon material may be subjected to momentary heat temporarily greatly in excess of the 507° F. melting point without destroying the nylon while at the same time performing the crimping operation above set forth.

The ability of the flexible nylon mono-fil rods to take a permanent crimp by heat makes possible the production of a very stable screen. If an object is inserted in a mesh opening of the screen, the strands defining the opening can spread, since they are elastic about the crimp, and since the crimp may be temporarily straightened out. But since the strands are permanently corrugated, removal of the object will cause the strands to resume their original position because they will naturally slide into complementary trough to trough engagement with each other.

While in the foregoing description I have emphasized the use of rods of material rather than multi-filament strands, I do not mean by rods any solid, inflexible, thick, elongated piece of material, but rather a length of fiber which essentially is composed of a single connected unitary piece rather than multi-filament fibers twisted or interwoven.

The rods may have the desired thickness for any particular use. The thinnest rod or filament which may be used is one which retains the inherent physical properties of the material above described, that is, one which may be crimped, which will be resilient and elastic and one in which the crimp will be restored upon relaxation of any deforming, distorting or tensioning force exerted thereon. The thickest rod or filament is also one which may be crimped and remain resilient in the manner above described.

The advantages of a thermosetting or thermoplastic, synthetic, organic or inorganic, non-metallic, elastic material for use in screens over metallic wire materials for use in such screens will be obvious. Taking nylon as an example, it has, under tests, resisted a five per cent solution of sulphuric acid for seven days, a five per cent solution of acetic acid two months, a one per cent solution of sodium hydroxide for two months.

Since nylon has a tensile strength of 51,000 pounds per square inch, a screen made from this material would be at least as strong if not stronger than the ordinary metallic wire screen commercially available at the present time.

It is less subject to the deleterious effects of acids, alkalis and other corrosive substances than any non-precious metallic materials that may be used for screening purposes.

It may be rolled and unrolled without acquiring a permanent set; it may resist weather indefinitely without being harmfully affected in any way; and for all of these reasons is far superior to any metallic wire screen which may be utilized for the same purposes.

Figure 11:
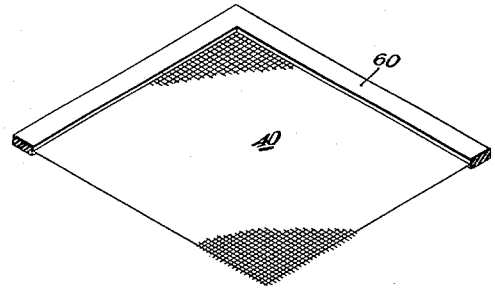
Figure 11 is a view in perspective showing a screen cloth having the form of Figures 6 or 9 and bound at the edges.

The screen, when it is finally formed, may be mounted in any suitable manner. It may be mounted in any molding of any type in a door or window or other frame of any building, building wall, vehicle or other structure. The edges may be bound off or encased by a flexible material of any suitable type as, for instance, the rubber molding 60 which binds the edges of the screen material 40 of Figure 11. Such a rubber or flexible binding molding may well bind the edges against unravelling, may permit flexing or tensioning of the screen in any direction in accordance with the inherent qualities of the screen of the present invention and may be utilized in any case where the screen itself must be flexible or rollable in any way, as for instance, in a rolling window screen.

Such a rubber or other flexible binding or molding for the screen may, when the screen is used in openings of any type provide a gasket like result of such a nature as to weatherproof or wind proof any opening in which it may be placed.

Owing to the fact that the material forming the screen of the present invention may have all of the properties herein above described and at the same time be transparent and translucent so that it will be insect and dust excluding without excluding light, the screen of my invention may have many additional uses which are not open to ordinary wire screens.

In the transparent form, it may well be used in shatter proof glass or as a substitute for the wire mesh of wire reinforced glass.

The field of use for such transparent or translucent screens in vehicles and in front of or instead of or in connection with vehicle openings or windshields is obvious.

In addition, owing to the fact that the material of which the screen of my invention is formed may readily be dyed in any suitable manner, screens formed in accordance with my invention need not be limited to a drab black or to a monotonous single color combination but different strands forming the screen may be colored in different ways to produce geometric designs or patterns coinciding either with the exterior trim or any interior decoration in connection with which it may be used.

Figure 10:
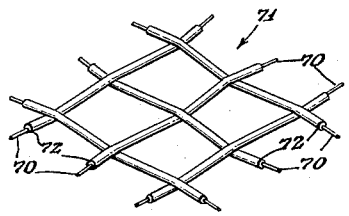
Figure 10 is a view in perspective showing a modified form of screen cloth comprising metallic wires covered with nylon and made in accordance with the present invention.

In addition where it is desired for any reason to utilize a wire screen and yet obtain the weather resistant qualities inherent in the screen of my invention, it may be possible, as is seen in Figure 10, to coat the wires 70 which are to form the screen 71 with a nylon coating 72. Where the wires 70 are of small diameter and the nylon coating is relatively heavy, then the crimping operations herein described may be utilized despite the presence of the wire core and the finished screen will have all of the beneficial and useful results of the crimped screen above described.

Where the wire is relatively thicker then the crimping operation may produce a result which tends to nevertheless maintain the stability of the screen, but the essential benefit then derived is mainly the weather proofed qualities.

It should be understood that the edges of the nylon screen when the screen is finished and cut from the continuous web (if the nylon screen is formed from a continuous web) may be bound off either by a rubber or other flexible binding or molding for the purposes above described or even by a metal or other inflexible binding or molding. And where that is desired, the edges of the screen may be dipped or coated with any suitable plastic or lacquer or any suitable self-setting or cementitious material for binding off or finishing or securing the edges of the screen against unravelling.

The use of many materials other than nylon and other than polymers of various types including vinyl compounds and other than thermoplastic or thermosetting synthetic resins and other than aldehyde condensation products or cellulose derivatives and other than alsifilm should now be clear to those skilled in the art.

The only element required is that the material used be either thermoplastic or thermosensitive; that it be non-metallic and organic and hence not subject to the corrosive effects to which metallic or inorganic materials may be subject and that it be sufficiently elastic to retain a crimp even after tension and that it be sufficiently flexible to permit displacement of individual strands or rolling of the entire screen. Within these limits, any other material may be used in addition to the materials above pointed out, or any other material having some of the properties above noted may for specific purposes be utilized as effectively as any of the materials above pointed out.

Having now described my invention in the various modifications which it may take, I prefer to be limited not by the specific disclosures, but only by the appended claims.

I claim:

1. A plain-weave open mesh window screen consisting essentially of intersecting warp and weft monofils of a synthetic linear polyamide condensation product, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with similar bases of troughs of the monofils with which it intersects, so that the monofils of the screen are elastically and resiliently yieldable to severe mesh-distorting forces without loss of crimp and are adapted to realign themselves into undistorted mesh-defining relationship after release of such mesh-distorting forces.

2. A plain-weave open mesh window screen fabric consisting essentially of intersecting warp and weft monofils of a synthetic linear polyamide condensation product, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofil with which it intersects, so that the monofils of the screen are elastically and resiliently yieldable to severe mesh-distorting forces without loss of crimp and are adapted to realign themselves into undistorted mesh-defining relationship after the mesh-distorting forces are released and the fabric is subjected to restoring forces.

3. A plain-weave open mesh window screen consisting essentially of intersecting warp and weft monofils of synthetic thermoplastic resin, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofil with which it intersects, so that the monofils of the screen are elastically and resiliently yieldable to severe mesh-distorting forces without loss of crimp and are adapted to realign themselves into undistorted mesh-defining relationship after release of such mesh-distorting forces.

4. A plain-weave open mesh window screen fabric consisting essentially of intersecting warp and weft monofils of synthetic thermoplastic resin, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofil with which it intersects, so that the monofils of the screen are elastically and resiliently yieldable to severe mesh-distorting forces without loss of crimp and are adapted to realign themselves into undistorted mesh-defining relationship after the mesh-distorting forces are released and the fabric is subjected to mesh-restoring forces.

5. A plain-weave open mesh window screen consisting essentially of intersecting warp and weft monofils of non-metallic material, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofils with which it intersects, so that the monofils of the screen are elastically and resiliently yieldable to severe mesh-distorting forces without loss of crimp and are adapted to realign themselves into undisturbed mesh-defining relationship after release of such mesh-distorting forces.

6. A plain-weave open mesh window screen consisting essentially of intersecting warp and weft monofils of non-metallic material, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofils with which it intersects, so that the monofils of the screen are elastically and resiliently yieldable to severe mesh-distorting forces, such as caused by thrusting a pencil through the screen, without loss of crimp and are adapted to realign themselves into undisturbed mesh-defining relationship after release of such mesh-distorting forces.

7. A plain-weave open mesh window screen fabric consisting essentially of intersecting warp and weft monofils of non-metallic material, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with bases of troughs of any monofil with which it intersects, so that the monofils of the screen are elastically and resiliently yieldable to severe mesh-distorting forces without loss of crimp and are adapted to realign themselves into undistorted mesh-defining relationship after the mesh-distorting forces are released and the fabric is subjected to mesh-distorting forces.

8. A plain-weave open mesh window screen fabric consisting essentially of intersecting warp and weft monofils of synthetic thermoplastic resin of the group consisting of vinyl resins, aldehyde condensation products, and alkyd resins, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with similar bases of troughs of the monofils with which it intersects so that the monofils of the screen are elastically and resiliently yieldable to severe mesh-distorting forces without loss of crimp and are adapted to realign themselves into undistorted mesh-defining relationship after release of such mesh-distorting forces.

9. A plain-weave open mesh window screen consisting essentially of intersecting warp and weft monofils of cellulose derivatives from the group consisting of cellulose nitrates, cellulose acetates, cellulose ether, ethyl and benzyl cellulose, each monofil being elastic and resilient and having a series of regularly recurring obtuse crimps in alternately opposite directions forming a succession of oppositely directed troughs in the monofil, the individual crimps being permanent and fixed in position along the length of the individual monofil, the bases of the troughs of any monofil complementarily registering with and engaging with similar bases of troughs of the monofils with which it intersects so that the monofils of the screen are elastically and resiliently yieldable to severe mesh-distorting forces without loss of crimp and are adapted to realign themselves into undistorted mesh-defining relationship after release of such mesh-distorting forces.

HARRY W. THOMAS.

CERTIFICATE OF CORRECTION.

Patent No. 2,364,404. December 5, 1944.

HARRY W. THOMAS.

It is hereby certified that error appears in the printed specification of the above numbered patent requiring correction as follows: Page 6, second column, line 19, claim 7, for "mesh-distorting" read --mesh-restoring--; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.